United States Patent [19]
Boone et al.

[11] Patent Number: 5,355,063
[45] Date of Patent: Oct. 11, 1994

[54] ROBOTIC SYSTEM FOR SERVICING THE HEAT EXCHANGER TUBES OF A NUCLEAR STEAM GENERATOR

[75] Inventors: Paul J. Boone, Bethel Park; Michael H. Canton, Wilkinsburg; Stanley F. Niziol, Whitehall; Tara D. Mapson, Pittsburgh; Bruce R. L. Cox, Springdale Twp., Allegheny Co.; Raymond G. Kelly, Jr., Pittsburgh; Robert P. Vestovich, Monroeville; George A. Savage, Rostraver Twp., Westmoreland County; Robert D. Senger, Greensburg; Michael D. Hecht, Hempfield Twp., Westmoreland County; Kurt K. Lichtenfiels, Murrysville; Anthony Grieco, Penn Hills, all of Pa.; Wenche W. Cheng, Orlando, Fla.

[73] Assignee: Westinghouse Electric Corp., Pittsburgh, Pa.

[21] Appl. No.: 607,705

[22] Filed: Nov. 1, 1990

[51] Int. Cl.$^5$ .............................. G05B 19/19
[52] U.S. Cl. .................. 318/568.11; 318/605; 901/9; 901/23; 165/11.2
[58] Field of Search .............. 318/560, 567, 568.1, 318/568.11, 568.12, 568.2, 568.21, 568.23, 569, 561, 600, 605; 901/1, 2, 9, 14, 23–24; 414/1, 8, 749–751; 165/1, 11.2

[56] References Cited

U.S. PATENT DOCUMENTS

| | | | |
|---|---|---|---|
| 4,196,049 | 4/1980 | Burns et al. | 176/19 R |
| 4,393,920 | 7/1983 | Shima et al. | 165/11 A |
| 4,449,884 | 5/1984 | Motoda | 414/749 |
| 4,652,204 | 3/1987 | Arnett | 414/751 X |
| 4,696,612 | 9/1987 | Germond et al. | 414/8 |
| 4,804,038 | 2/1989 | Klahn et al. | 165/11.2 |
| 4,876,871 | 10/1989 | Arzenti et al. | 72/122 X |
| 4,919,194 | 4/1990 | Gery et al. | 165/1 |
| 4,975,856 | 12/1990 | Vold et al. | 318/568.19 X |

FOREIGN PATENT DOCUMENTS

| | | |
|---|---|---|
| 008386 | 3/1980 | European Pat. Off. . |
| 0138583 | 4/1985 | European Pat. Off. . |
| 0434868 | 7/1991 | European Pat. Off. . |
| 2164752 | 3/1986 | United Kingdom . |
| WO88107655 | 10/1988 | World Int. Prop. O. . |

Primary Examiner—William M. Shoop, Jr.
Assistant Examiner—Martin David
Attorney, Agent, or Firm—W. S. Stevens

[57] ABSTRACT

An improved robotic arm system for servicing the tubesheet located within the channel head of a nuclear steam generator is provided. The system includes a robotic arm whose shoulder and elbow joints are rotatable only in the plane parallel to the tubesheet in order to eliminate the imposition of cantileverly-induced torques on the electric motors driving these joints, as well as to minimize the possibility of mechanical interference between the arm and the walls of the channel head. Each of the motorized joint assemblies of the arm includes resolvers connected not only to the output of the drive train that moves the joint, but also to the drive shaft of the electric motor that drives the drive train, wherein the feedback signal generated by the resolver connected to the drive shaft of the electric motor is the primary signal used to modulate the amount of electric power conducted to the motor of the joint. Such a configuration advantageously results in smoother robotic arm movement. Finally, the control circuit assembly of the robotic arm system includes a control processing unit (CPU) which is capable of simultaneously driving not only the joint assemblies of the robotic arm, but also any computer-operated mechanisms associated with a variety of end effectors which the arm is capable of delivering. The CPU, power supply and other components of the control circuit assembly are installable in the containment area surrounding the steam generator in order to eliminate the number of cable penetrations through the containment walls that are necessary to operate the system.

42 Claims, 8 Drawing Sheets

ROBOTIC SYSTEM FOR SERVICING THE HEAT EXCHANGER TUBES OF A NUCLEAR STEAM GENERATOR

BACKGROUND OF THE INVENTION

This invention generally concerns robotic systems, and is specifically concerned with an improved robotic system for servicing the heat exchanger tubes of a nuclear steam generator that includes a robotic arm capable of providing smoother and more accurate delivery of heavier payloads than prior art systems, and a single consolidated control system capable of simultaneously operating both the arm and a computer controlled end effector.

Because of the radiation hazard present within the steam generators used in a nuclear-powered utility, the heat exchanger tubes of such steam generators must be, for the most part, remotely serviced to avoid exposing maintenance personnel to potentially harmful radiation. Consequently, a number of robotic systems have been developed for remotely preforming repair and maintenance operations on these heat exchanger tubes These robotic systems generally include some sort of robotic delivery arm in combination with any one of a number of specialized tools designed to be carried by the robotic arm, which are known in the art as "end effectors". The type of robotic arms that are presently available on the market fall into two basic categories, which shall be referred to in this application as full movement arms, and limited movement arms. Full movement arms are capable of maintaining an end effector at a desired orientation while moving it along a trajectory having components in all three spatial axes. By contrast, limited movement arms are capable of moving an end effector only along a selected two dimensional trajectory, and cannot maintain the end effector at a desired orientation along this trajectory. The mechanical action of limited movement robotic arms often resembles the operation of a compass used to draw circles, i.e., one end of the arm is pivotally mounted at a point on the flat tubesheet within the channel head of the nuclear steam generator, while the middle portion of the arm is telescopically extendible or retractable. Such arms are capable of sweeping their distal, tool-holding ends across any one of a number or arcs of greater or lesser radii which intersect with desired delivery points on the tubesheet. An example of such a limited movement robotic arm is the Model SM-10 arm manufactured by Zetech located in Isaquah, Washington.

Full movement arms differ from the relatively simplistic structure of the previously described arms in that they include six different segments which are articulated at six different motor-driven joints, which in turn allows movement around six different axes. The more complex structure of such robotic arms allows them to use three of their axes of movement to hold an end effector at a desired orientation, and the other three axes to move the end effector across an infinite number of trajectories in three dimensions while maintaining the end effector at the desired orientation. Such abilities are highly advantageous in situations where it is essential to maintain the end effector at a constant orientation during a servicing operation, as is often the case with a weld head being moved around the location of a desired weld seam. While limited movement arms are often necessarily dedicated to the delivery and manipulation of a single end effector, such as for example a tube inspection probe, full movement arms have the ability in theory to couple onto and de-couple from a variety of end effectors. One of the most advanced designs of such full movement robotic arms is the ROSA (remotely operated service arm) developed by the Westinghouse Electric Corporation located in Pittsburgh, Pennsylvania.

Unfortunately, neither of these two types of robotic arm is without drawbacks. While limited movement robotic arms are relatively simple and inexpensive to construct and to install in nuclear steam generators, the fact that they are typically dedicated to a single end effector necessitates the installation and removal of a number of such arms to complete inspection and servicing operations on the heat exchanger tubes within the channel head of the steam generator. This is a significant shortcoming as every such installation procedure is not only laborious and time-consuming, but also results in the exposure of the operating personnel to potentially harmful radiation. This last drawback is of growing importance, as the NRC (Nuclear Regulatory Commission) has recently placed greater limitations upon the amount of radiation exposure that such operating personnel may absorb. Moreover, the fact that such limited movement robotic arms cannot maintain an end effector at a desired orientation while simultaneously moving it across a chosen trajectory across the tubesheet renders them useless for end effectors that require a constant orientation, such as weld heads. Of course, full movement robotic arms such as the aforementioned ROSA are not limited in these ways. However, prior art full movement robotic arms such as the ROSA also have limitations that offer room for improvement. Specifically, the applicants have noticed that the vertically oriented "elbow" of the ROSA disadvantageously limits the number and length of the possible trajectories that the distal end of the arm may make without mechanically interfering with the bowl-like wall of the channel head, or the divider plate within the channel head, or the cables which vertically drape down from end effectors such as the eddy current probes used to inspect and determine the condition of the interior walls of the heat exchanger tubes. The applicants have also observed that the prior art ROSA is configured so that a large portion of the arm is cantileverly supported from its vertically oriented elbow, which in turn applies a significant amount of life-reducing extraneous torque to the electric motor driving the joint, and reduces its payload carrying ability. Further, the applicants have observed that the motion of the distal end of such robotic arms is not smooth enough to conduct certain welding operations. This lack of smoothness has been found to arise from the fact that the resolvers that are coupled to the outputs of the drive trains which rotate the articulated joints generate a feedback signal which is unfortunately characterized by a certain degree of "noise" which becomes superimposed over the power input to the electric motor as the result of the feedback loop. Several proposals have been made to eliminate the resulting undesirable "jerkiness" of the movement of such arms by processing the feedback signal to smooth the noise out before it enters the central processing unit which modulates the power into the electric motor that turns the joint. However, none of these proposals has met with the desired success. Because the feedback signal must be conducted to the CPU in real time, any processing which results in signal delays is unacceptable. Accordingly, it has been proposed to process the feedback signal by anticipating the shape of the feedback signal, and eliminating it without any real time delays. However, the shape of the curve of such noise is highly complex, and hence is essentially anticipatable, due to the presence of complex "wind-up" torques present in the shafts of the resolvers at the start of any desired arm trajectory. Still other limitations that interfere with the usefulness of known, full movement arms is the fact that the control systems for the arms and the end effectors delivered by these arms are completely separate systems that require their own cable penetrations into the containment area of the facility. The resulting large number of cables results in long set-up times, and further requires the decontamination or discarding of long lengths of expensive cable after each servicing operation.

Clearly there is a need for a full movement robotic arm which is not limited by the drawbacks associated with prior art arms. Specifically, such an arm should be capable of reaching most, if not all of the areas of the tubesheet within the channel head of the steam generator without mechanically interfering with either the bowl-shaped walls of the channel head, the divider plate, or with cables handing down from the various end effectors used in conjunction with the arm. Moreover, the arm should be capable of handling large payloads without the application of excessive torques on the electric motors driving the various joints of the arm, and should further be capable of accurately and reliably delivering an end effector to a location on the tubesheet at any desired orientation. Ideally, the motion of the robotic arm should be sufficiently smooth to conduct very fine welding operations, or any other precision operation associated with the servicing of the steam generator. Finally, the control system associated with such an arm should be easy to setup in a very short period of time within the nuclear facility, and should minimize the number of decontamination tasks after the maintenance operation has been performed.

SUMMARY OF THE INVENTION

Generally speaking, the invention is a robotic arm system that eliminates or at least ameliorates the aforementioned drawbacks associated with the prior art. More specifically, the robotic arm system of the invention comprises a base assembly for cantileverly supporting a robotic arm, at least first, second and third arm segments for forming an articulated robotic arm, and at least first and second motorized joint assemblies rotatably connecting the base assembly to the first arm segment, and the first and second arm segments, respectively, wherein the first and second joint assemblies are rotatable only around substantially vertical axes to prevent the application of cantileverly-induced torque on the motor mechanisms driving the joint assemblies. Such a configuration relieves the electric motors which drive what amounts to the "shoulder" and "elbow" joints of the arm from loads applied to these joints as a result of the weight of the distal end of the arm. The relief of such a weight load on the motors driving these joints increases both the payload and the accuracy of the arm, as well as the lifetime of the driving motors. Moreover, the applicants have found that such a configuration advantageously reduces the opportunities for mechanical interference between the elbow joint of the arm and both the walls of the channel head, and any cables which may drape down from the end effectors that the arm delivers, which is turn expands both the length and number of possible delivery trajectories.

The motor mechanisms of each of the joint assemblies includes a drive train having an input shaft and an output shaft, and an electric motor having a drive shaft connected to the input shaft of the drive train. To insure that the movement of the arm will be as smooth as possible, each of the joint assemblies further includes first and second resolvers whose input shafts are connected to the drive shaft of the electric motor and the output shaft of the drive train, respectively, wherein the feedback signal generated by the first resolver that is connected to the drive shaft of the electric motor is connected to a control circuit that modulates the amount of electric power conducted to the electric motor, and wherein the output of the second resolver is periodically compared to the output of the first resolver in order to determine whether or not any slippage has occurred in the linkage between the drive shaft of the motor, and the drive train. The dominate use of the feedback signal generated by the motor drive shaft instead of the output shaft of the drive train to modulate power with the electric motor of the joint advantageously eliminates the imposition of mechanical noise over the power modulation signal, which in turn eliminates the jerkiness associated with the prior art. These first and second resolvers are preferably arranged in tandem, and are concentrically located in a cavity in the electric motor driving the joint in order to minimize the space required by the resolvers within the motorized joint assemblies. In the preferred embodiment of the invention, the input shaft of the rear resolver extends through the housing of the second resolver and is rotatably mounted within a bore present in the input shaft of the second resolver, thereby rendering the mechanical configuration of the two resolvers even more compact.

The control circuit assembly used in conjunction with the robotic arm system includes a single CPU operated controller which is capable of simultaneously controlling both the joint assemblies of the robotic arm, and any computer-controlled mechanism present in the end effector being delivered by the arm. Such a control circuit assembly advantageously eliminates the need for the installation and removal of a dedicated microprocessor for every different end effector used in conjunction with the arm. The control circuit may further include a power supply having a filter for smoothing out any voltage "spikes" which may be present in the electrical power generated by the electric utility in order to increase both the reliability and the accuracy of the robotic arm system. Finally, the power supply, and various other components of the control circuit of the invention are modularized into relatively small and light weight units which may be easily and advantageously installed within the containment area which surrounds the steam generator being serviced. Such a configuration advantageously eliminates most of the cable penetrations associated with the control circuits of prior art robotic arm systems, which were designed to be used outside the containment area surrounding the nuclear steam generator. Finally, the various components of the control circuit may each include a decontaminable cover to facilitate decontamination operations when the system has completed its task and is removed from the containment area.

BRIEF DESCRIPTION OF THE SEVERAL FIGURES

DETAILED DESCRIPTION OF THE PREFERRED EMBODIMENT

Figure 1:
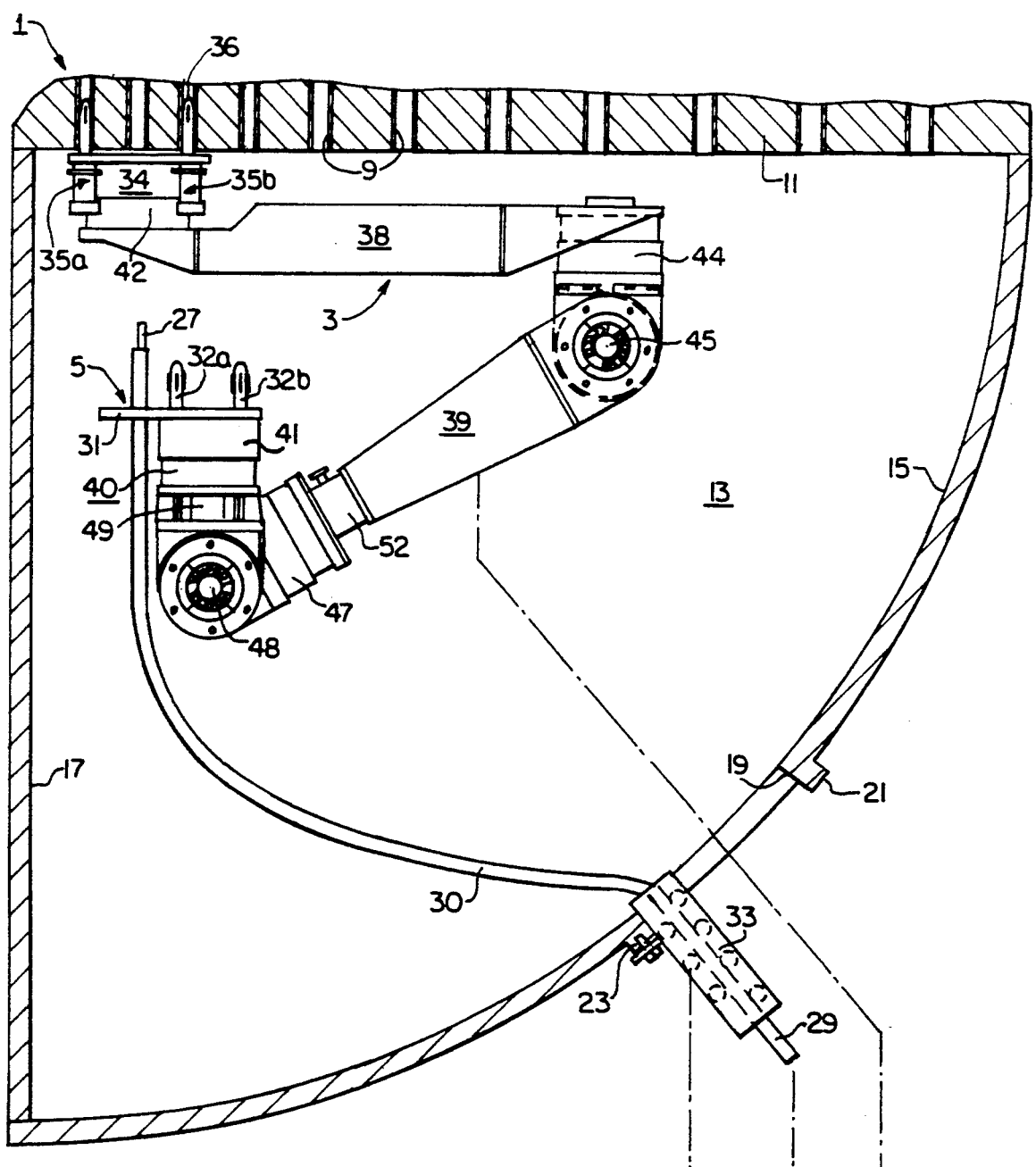
FIG. 1 is a side view of the improved robotic system of the invention, illustrating how it might be used to manipulate an end effector in the channel head of a nuclear steam generator.

With reference now to FIG. 1, wherein like numerals designate like components throughout all the several figures, the robotic arm system 1 of the invention generally comprises a robotic arm 3 that is capable of manipulating an end effector 5, such as an eddy current probe, in combination with a control circuit assembly 7 that simultaneously controls both the movement of the arm 3, and the operation of the end effector 5. The system 1 of the invention is particularly adapted for use in the servicing and repair of the heat exchanger tubes 9 mounted in the tubesheet 11 of the channel head 13 of a nuclear steam generator. Such channel heads 13 are generally quadraspherical in shape, having a convex wall 15 on one side and a flat divider plate 17 on the other side which borders an adjacent channel head (not shown) of the same shape. A manway 19 is present in the convex wall 15 of the channel head for affording access to the heat exchanger tubes 9 and tubesheet 11 after the steam generator has been shutdown. However, as such channel heads 13 of any steam generator that has been placed in service is radioactive, the manway 19 is used more for the admission of remotely-controllably tools than by service personnel who actually enter the channel head 15. The manway 19 is circumscribed around its exterior portion by an annular flange 21 having a plurality of uniformly-spaced bolt holes 23 which, under normal operating circumstances, are used to secure a manway hatch (not shown) over the channel head 13. As will be seen presently, these bolt holes 23 provide a convenient anchoring point for the various components of the end effectors 5 that are manipulated within the channel head 15, as well as for the loading fixture used to install the robotic arm 3.

As has been indicated earlier, the robotic arm 3 of the invention is particularly well adapted for the manipulation of an inspection-type probe such as an eddy current probe 27. Such a probe 27 is typically coupled to a flexible control cable 29 which is slidably movable through a guide tube 30 which is used to align and guide the probe 27 into the open end of a heat exchanger tube 9 to be inspected. The probe 27 further includes a base plate 31 having a pair of cam locks 32a,b spaced apart the same distance as the pitch of the heat exchanger tubes 9 so that they may be installed within the open ends of these tubes 9 and expanded in order to detachably secure the end effector 5 onto the tubesheet 11. Finally, the eddy current probe 27 includes a probe pusher/puller 33 for extending and retracting the probe 27 into and out of the heat exchanger tubes 9. In this particular example, the probe pusher/puller 33 is detachably secured to the rim of the manway by means of a bolt screwed into one of the aforementioned bolt holes 23.

Figure 2:
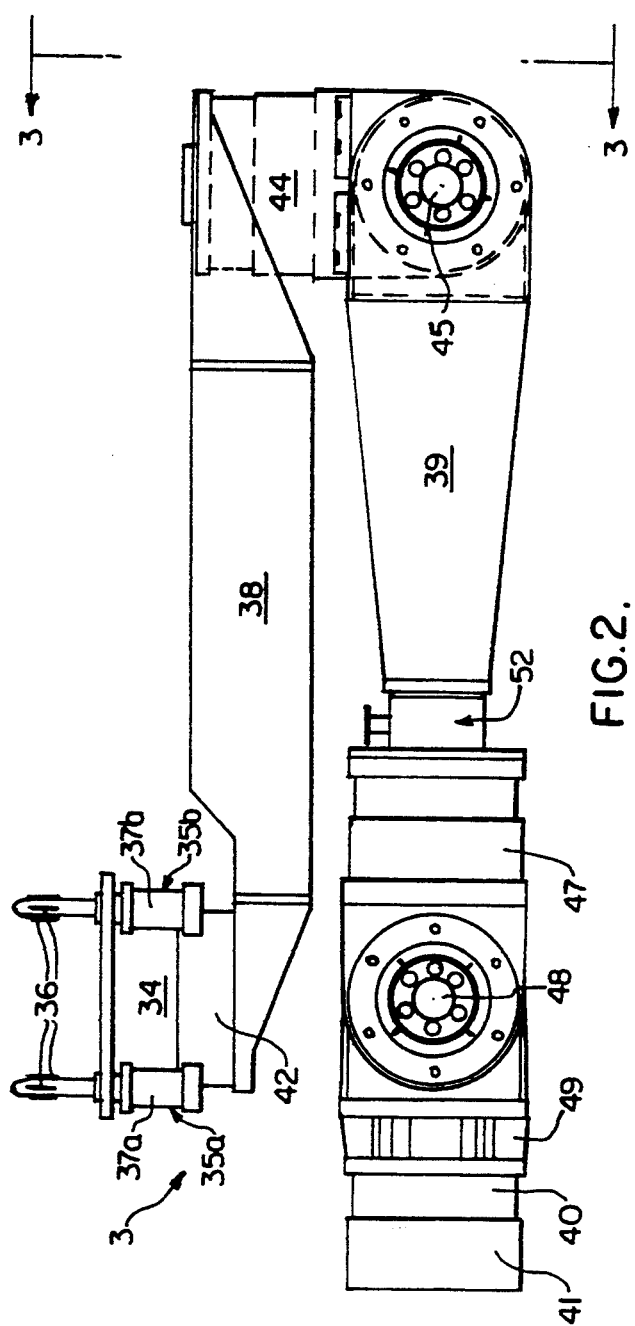
FIG. 2 is a side view of the robotic arm of the system.
Figure 3:
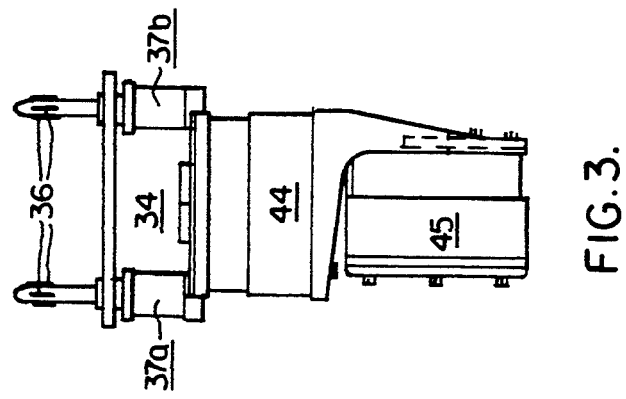
FIG. 3 is a front view of the robotic arm illustrated in FIG. 2 along the lines 3—3.

With reference now to FIGS. 1, 2 and 3, the robotic arm 3 of the invention generally comprises a base assembly 34 having a pair of cam lock assemblies 35a,b which are capable of radially extending a plurality of fingers 36 into and out of engagement with the inner diameter of a pair of vacant heat exchanger tubes 9. For this purpose, each of the cam lock assemblies 35a,b includes a hydraulic actuator 37a,b. To allow the cam lock assemblies 35a,b to bear as much weight as possible without galling or otherwise damaging the interior of the heat exchanger tubes 9, the radially extendible fingers 36 should be dimensioned so that their peripheral portions engage at least 30 percent, and more preferably 60 percent of the inner circumference of the heat exchanger tubes 9. Additionally, the tube-contacting surfaces of these fingers 36 should engage the inner tube walls with a force of about 1500 lbs.

Connected to the base assembly 34 is an articulated robotic arm formed from an upper arm segment 38, a lower arm segment 39, and a wrist segment 40. Preferably, all of the arm segments 38, 39 and 40 are formed from a strong yet light weight material that is easy to radioactively decontaminate, such as an aluminum alloy. At the distal most end of the articulated robotic arm is an end effector coupler 41 which is capable of remotely coupling to and decoupling from an end effector 5 such as the eddy current probe illustrated.

The arm segments 38,39,40 are interconnected by means of a plurality of motorized joint assemblies. Specifically, the base assembly 34 is connected to the upper arm segment 38 by means of a shoulder joint assembly, while the upper arm segment 38 is connected to the lower arm segment 39 by the combination of an upper elbow joint assembly 34, and a lower elbow joint assembly 45. The lower arm segment 39 is connected to the wrist segment by means of a proximal wrist joint assembly 47, an intermediate wrist joint assembly 48 and a distal wrist joint assembly 49. It should be noted that the shoulder joint assembly 42 and the upper elbow joint assembly 44 are each rotatable along a vertically oriented axis (or z Cartesian axis), while the lower elbow joint assembly 45 and intermediate wrist joint assembly 48 are rotatable around one of two horizontal axes (the x axis), while the proximal and distal wrist joint assemblies 47,49 are each rotatable along the other of two horizontal axes (the y axis). The provision of six different joint assemblies in the robotic arm 3 with the previously described rotational abilities allows the robotic arm 3 to maintain the arm coupler 52 at a desired orientation while moving it through any one of a number of infinite trajectories having components of motion along all three spatial axes, thus rendering the arm 3 a "full movement" arm in conformance with the definitions set forth in the background section of this specification. Moreover, because the first two joint assemblies 42,44 are rotatable only along a vertically-orientated axis, the motors driving these joint assemblies 42,44 are not subjected to spurious, gravity-induced torque created by the weight of the lower elbow joint assembly 45, the lower arm segment 39, and the wrist joint assemblies 47, 48 and 49. Such a design removes a considerable torque load from the shoulder joint assembly 42 in particular, as most of the weight of the robotic arm 3 is attributable to the joint assemblies, and as the torque applied by in particular the three wrist joint assemblies 47,48,49 located at the distal end of the arm 3 against the shoulder joint assembly 42 is considerable. The fact that the shoulder joint assembly 34 and upper elbow joint assembly 44 can only rotate along a vertically-oriented axis not only relieves cantileverly-induced torque from the motor driving the joint assembly 42, (thereby protracting the life of the electric motor that drives it), but increases the overall payload that the arm 3 can bear, and even increases the accuracy of the arm 3 in delivering a particular end effector 5. Another more subtle advantage of the horizontally movable shoulder and elbow of the arm 3 is the fact that this particular configuration is less apt to mechanically interfere with either the convex walls 15 or divider plates 17 within the channel head 13, or even with the cables 29 and guide tubes 30 that typically drape down from end effectors 5 like the eddy current probe 27 illustrated in FIG. 1.

Figure 4:
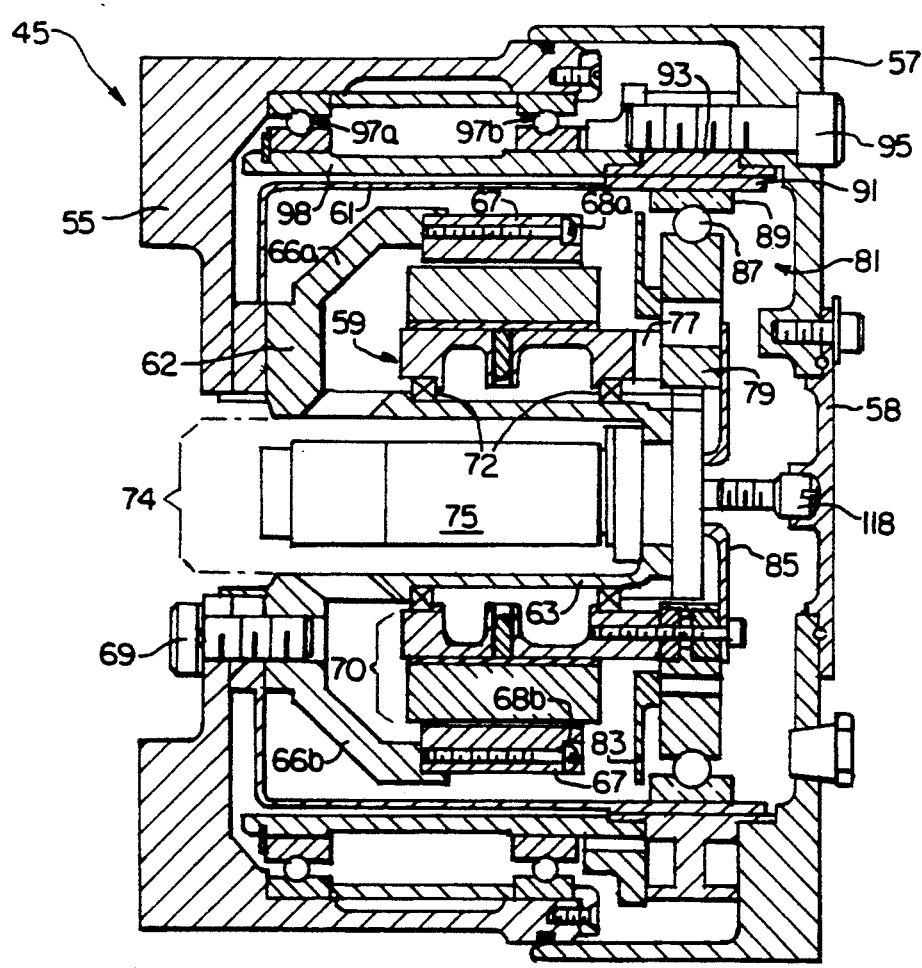
FIG. 4 is a cross-sectional side view of one of the joint assemblies used in the robotic arm of the invention.

With reference now to FIG. 4, each of the joint assemblies is formed from a stationary housing 55 connected to either the base assembly 34 or the proximal end of one of the arm segments 38,39,40, as well as to a rotatable housing 57 which is connected to the distal end of one of the arm segments 38,39,40, or the end effector coupling 41. Both of these housings 55,57 are generally cylindrical in shape, the outer peripheral wall of the rotatable housing 57 overlapping the outer peripheral wall of the stationary housing 55. To provide access to the interior of the joint assembly 45, the rotatable housing 57 includes a circular cover plate 58 in the position illustrated.

Disposed within the interior of both of the housings 55,57 is an electric motor 59. Preferably, the electric motor 59 used in each of the joint assemblies is a brushless, permanent magnet d.c. motor which may be, for example, model no. QT-3810A available from the Endland Motor Subsidiary of Kollmorgan Corporation located in Radford, Virginia. The electric motor 59 of each of the joint assemblies is contained within a cup-shaped motor housing 61 which is supported within the stationary housing 55 by means of a motor frame 62.

The motor frame 62 includes a tubular support member 63 which is concentrically aligned with the axis of rotation of the motor 59, as well as a plurality of bracket members 66a,b which support the stator ring 67 of the motor. More specifically, the stator ring 67 is connected to the distal ends of the bracket members 66a,b by means of screws 68a,b. Mounting bolts 29 in turn secure both the motor frame 62 and the motor housing 61 to the stationary housing 55. The rotor 70 of the electric motor 59 is rotatably supported by the tubular support member 63 of the motor frame 62, and is closely spaced to the inner periphery of the stator ring 67. A pair of annular bearings 72 minimize the frictional contact between the outer surface of the tubular support member 63, and the inner periphery of the rotor 70. The inner periphery of the tubular support member 63 defines a cylindrical space 74 which houses a resolver assembly 75 capable of generating an electrical signal indicative not only of changes in the angular position of the rotatable housing 57 relative to the stationary housing 55, but also angular changes of position of the rotor 70 of the motor 59.

The rotor 70 of the electric motor 59 does not drive the rotatable housing 57 directly, but only through a harmonic drive assembly contained within the housing 57. To this end, the rotor 70 includes a locking tab 77 which is engaged within a slot in the drive disk 79 of a harmonic drive assembly 81. On the inner surface of this drive disk 78, an oil splash flange 83 is provided, while on the outer side of this disk 79 the outer flange 85 of the resolver assembly 75 is connected. A plurality of ball bearings 87 (of which only two are shown), are rotatably received within a plurality of spherical indentations present around the periphery of the drive disk 78. These ball bearings 87 rotatably engage a flexible spline ring 89 whose outer periphery engages the inner periphery of the cup-shaped motor housing 61 such that the rotation of the drive disk 79 causes the ball bearings to flexibly deform the periphery of the housing 91 by the action of the ball bearings 87. Disposed around the periphery of the cup-shaped motor housing 61 are a plurality of small, cog-like teeth (not shown). These teeth engage another set of small, cog-like teeth present around the inner periphery of an outer drive ring 93 such that the flexure of the teeth present on the outer periphery 91 of the motor housing 61 induces a rotation of the outer drive ring 93. Because this drive ring 93 is connected to the rotatable housing 57 by means of mounting bolts 95, the housing 57 rotates relative to the stationary housing 55. To facilitate such rotation, a pair of annular ball bearing assemblies 97a,b are disposed between the inner cylindrical wall of the stationary housing 55, and an outer support wall 98 which is connected to the rotatable housing 57 by the same bolts 95 that secure the outer drive ring 93 to the housing 57. In the preferred embodiment, the harmonic drive assembly 81 is a model no. 733 1555 200 manufactured by the Harmonic Drive Division of Emhart Machinery Group located in Wakefield, Massachusetts.

Figure 5:
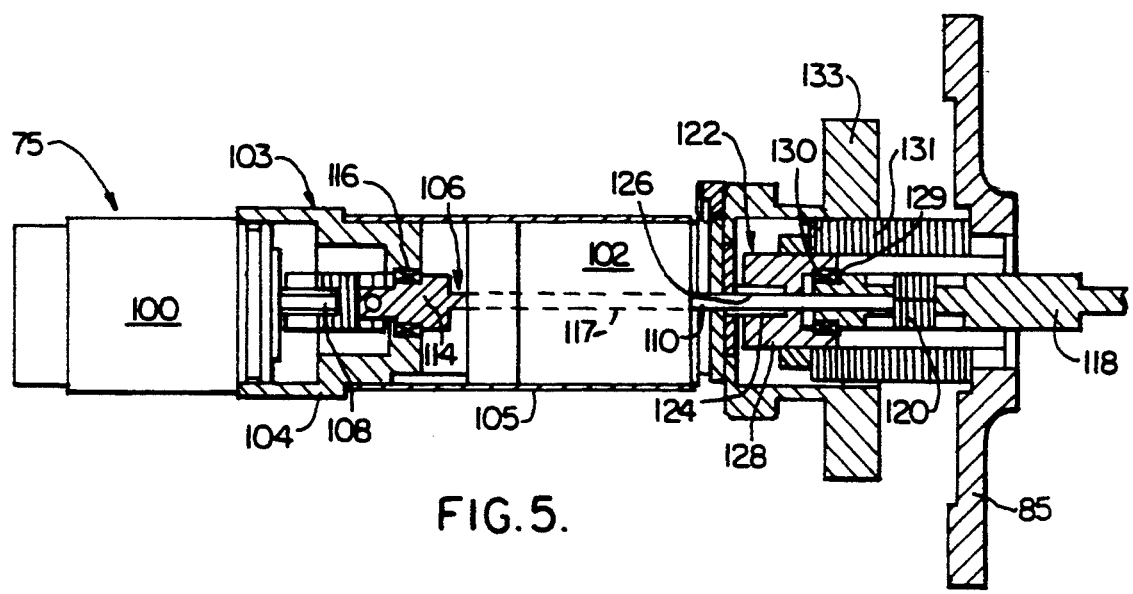
FIG. 5 is a cross-sectional side view of the resolver assembly used in each of the joint assemblies of the robotic arm of the system.

With reference now to FIG. 5, the resolver assembly 75 includes a rear (or joint) resolver 100, and a front (or motor) resolver 102. A housing assembly 103 mechanically interconnects the rear and front resolvers 100,102 in an in-tandem relationship. To this end, the housing assembly 103 has a proximal cap member 104 whose principle purpose is to support the input shaft assembly 106 of the rear resolver 100, as well as a tubular distal member 105 whose principle function is to couple together the rear and front resolvers 100,102 in an in-tandem relationship.

The input shaft assembly 106 of the rear resolver 100 includes a stub shaft 108 that extends out of the front face of the resolver 100 which is in turn connected to a shaft extension 110 by means of a bellows coupling 112. While other types of couplings may be used, a bellows coupling 112 is preferred due to its forgiveness of small misalignments between the stub shaft 108 and shaft extension 110. The proximal end of the shaft extension 110 includes an enlarged annular shoulder 114 which rides upon an annular bearing 116 supported by the previously mentioned proximal cap member 104 of the housing assembly 103. The central portion of the shaft extension 110 is journalled within a specially provided bore 117 which is concentrically aligned along the axis of rotation of the front resolver 102. The distal end of the shaft extension 110 is coupled to a shaft output member 118 which in turn is connected to the rotatable housing 57 of each of the joint assemblies (see FIG. 4). Thus the input shaft 108 of the rear resolver 100 is directly mechanically attached to the output of the joint assembly in which it is mounted.

The front resolver 102 likewise has an input shaft assembly 122, starting with a stub shaft 124 that extends out of the front face of the resolver. The stub shaft 124 includes a bore 126 for rotatably conducting the previously described distal end of the shaft extension 110 of the input shaft assembly 106 of the rear resolver 100. The exterior of the stub shaft 124 is connected to an intermediate shaft member 128. This shaft member 128 includes a recess 129 at its distal end which receives a bearing 130 which rotatably supports the distal end of the shaft extension 110. The outer surface of the intermediate shaft member 128 is coupled to the previously mentioned outer flange 85 (which in turn is connected to the drive disk 79 of the harmonic drive assembly 81) through another bellows coupling 131. Because the drive disk 79 is directly connected to the rotor 70 of the electric motor 59, the front resolver 102 is directly engaged to the output of the motor 59. In the preferred embodiment, both of the resolvers are preferably model nos. AS-849-S-001 resolvers manufactured by Clifton Precision, located in Clifton Heights, Pennsylvania, (as modified by the Westinghouse Electric Corporation). In operation, each of the resolvers 100,102 is, in effect, a small electrical generator which is capable of generating a sinewave analog signal indicative both the speed and amount of the rotation applied to their respective input shaft assemblies 106,122. As will be explained hereinafter, the use of two resolvers whose input shafts are connected to the outputs of the joint assembly and to the rotor of the motor driving the joint, respectively, provides superior control characteristics of the arm 3. Moreover, the in-tandem arrangement of the resolvers 100, 102 provide an extremely compact resolver assembly 75 which may be conveniently and compactly arranged within the cylindrical space 74 provided by the interior of the tubular support member 63 of the motor frame 62.

Figure 6:
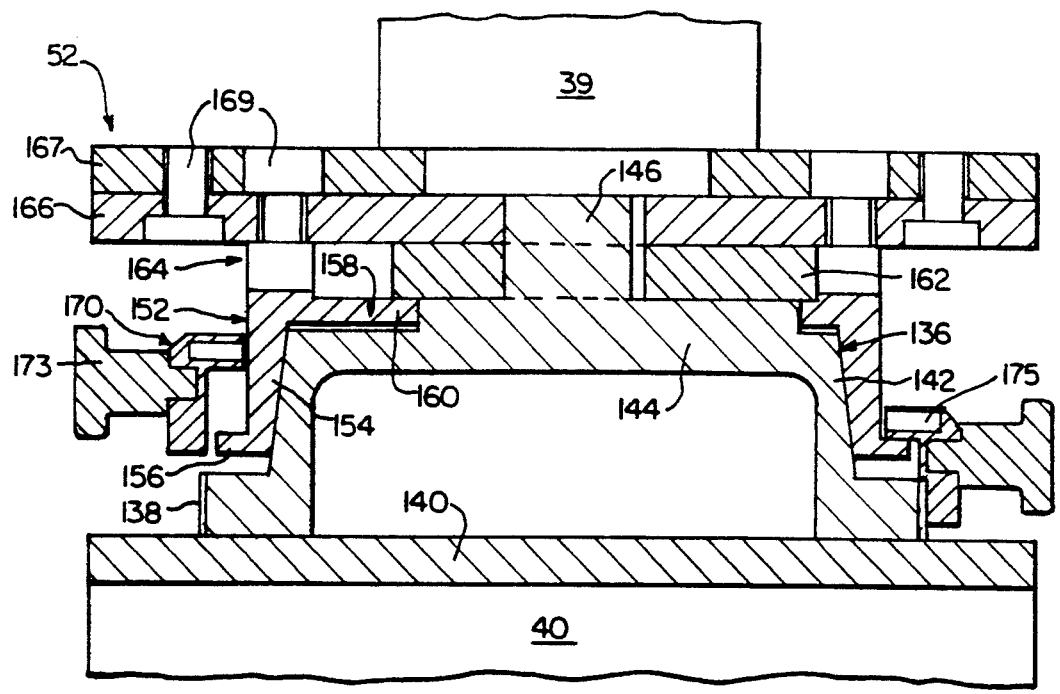
FIG. 6 is a cross-sectional side view of the arm coupler used to detachably connect the upper and lower arm segments of the robotic arm from its wrist segment.
Figure 8:
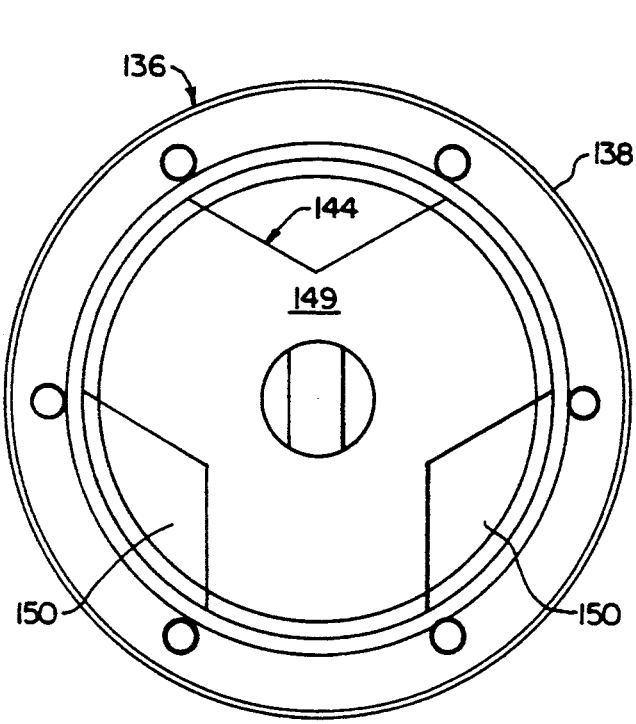
FIG. 8 is a front view of the female member illustrated in FIG. 7 along the lines 8—8.
Figure 7:
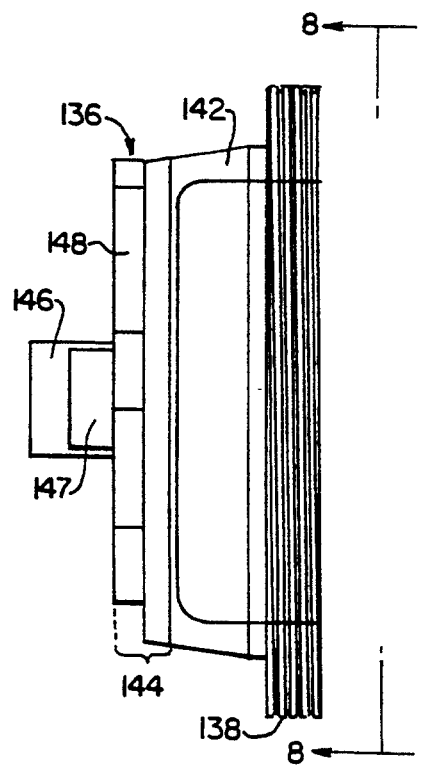
FIG. 7 is a side view of the female member used in the arm coupler illustrated in FIG. 6.

With reference now to FIGS. 6, 7 and 8, the arm coupler 52 of the robotic arm 3 that detachably joins lower arm segment 39 with the wrist segment 40 generally comprises a male member 136, and a female member 152 that are detachably joined together by means of a threaded mounting ring 171.

The male member 136 includes an annular, threaded flange 138 that is connected to a support plate 140 which is in turn attached to the end of the wrist segment 40. A frusto-conical side wall 142 is integrally connected to the annular, threaded flange 138. The side wall 142 terminates in a top plate member 144. As is most clearly seen in FIGS. 6 and 7, a bracket 146 projects outwardly from the top surface of the top plate member 144. This bracket member has a rectangular opening 147 whose purpose will be explained hereinafter. The upper portion of the top plate member 144 includes a Y-shaped member 148 which is best seen in FIG. 8. Disposed between the three legs of this Y-shaped member are three triangular cutouts 150 angularly spaced 120° apart from one another. As will be seen shortly, these triangular cut-outs 150 interfit with complimentarily-shaped triangular flanges present on the female member 152 to prevent the male and female member 136,152 from rotating relative to one another when the two are joined.

With reference again to FIG. 6, the female member 152 of the coupler 52 likewise includes a frusto-conical sidewall 154 which is complimentary in shape and interfittable over the frusto-conical sidewall 142 of the male member 136. At its bottom portion, this frusto-conical sidewall 154 terminates in a lip 156 which engages the threaded mounting ring 170 when the coupler 52 is secured together. The upper portion of the female member 152 terminates in a top plate member 158 which is complimentary in shape to the top plate member 144 of the male member 136. More specifically, the top plate member 158 of the female member 152 includes the aforementioned triangular flanges 160 which extend through the triangular cutouts 150 of the male member 136 when the male and female member 136, 152 are joined in the manner illustrated in FIG. 6.

To assist the system operator in joining the male and female members 136,152 the coupler 52 includes a locking bar 162 which is illustrated in FIG. 6. This locking bar 162 is insertable within a slot 164 defined between the upper surfaces of the top plate members 144 and 158 of the male and female members 136,152 and a lower support plate 166 which is attached to an upper support plate 167 that in turn is affixed to the end of the lower arm segment 39. This slot 164 is aligned with the previously mentioned opening 147 in the bracket 146 that extends from the top plate member 144 of the male member 136. The purpose of the locking bar 162 is to provide a means wherein the system operation can readily interconnect the male and female members 136,152 in "sliding bolt" fashion prior to joining them by means of the threaded mounting ring 170. Thus, the provision of the locking bar 162 expedites the coupling operation, and minimizes the exposure of the operator to the radiation emanating out of the manway 19 of the channel head 13. The threaded mounting ring 170 has a pair of opposing knobs 173 to allow the ring 170 to easily handled and turned by a system operator. Ball detents 175 are included at the uppermost portion of the ring 170. Each of these detents 175 includes a spring loaded ball that snaps into a groove when the ring 170 is screwed completely down into a securing position in order to inform the system operator that the joining operation between the male and female members 136 and 152 has been completed.

Figure 9:
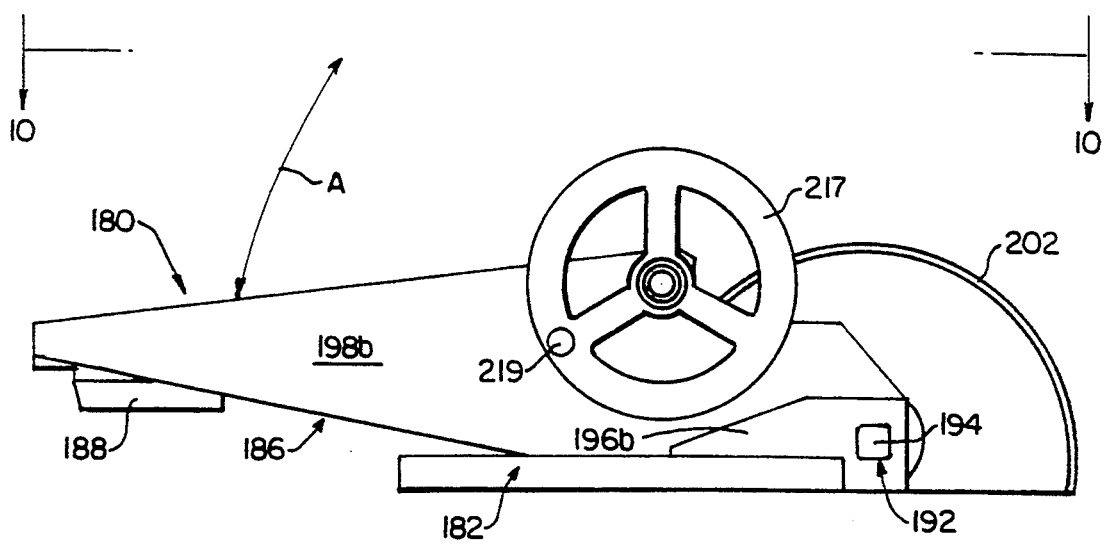
FIG. 9 is a side view of the loading fixture used to install the robotic arm into the channel head of a nuclear steam generator.
Figure 10:
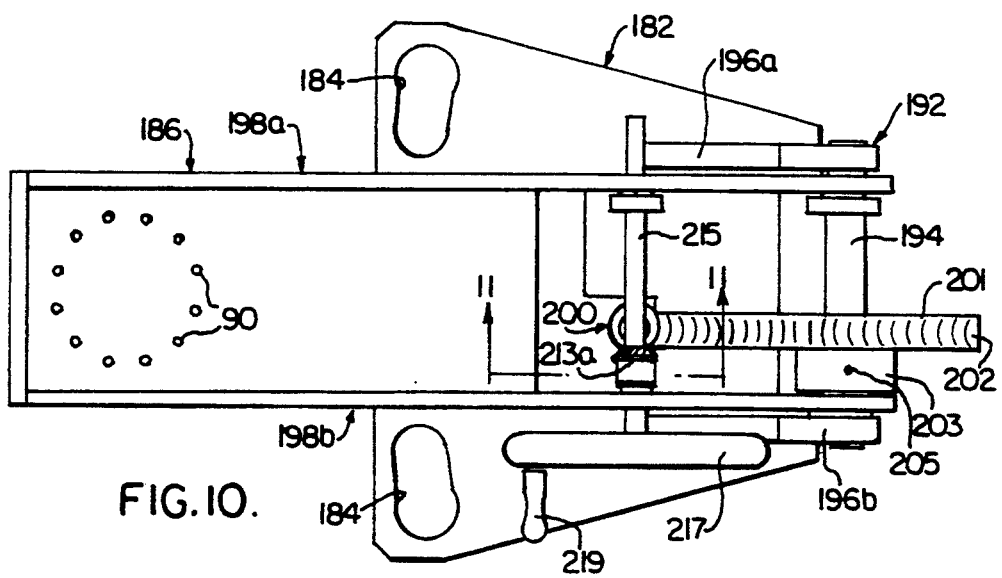
FIG. 10 is a plan view of the loading fixture illustrated in FIG. 9 along the line 10—10.

With reference now to FIGS. 9 and 10, the robotic arm system 1 of the invention further includes a loading fixture 180 for loading the robotic arm 1 into the relatively narrow access afforded by the manway 19 of the channel head 13. To this end, the loading fixture 180 includes a base plate 182, and a support frame 186 pivotally mounted onto the base plate 182.

The base plate 182 has a pair of opposing keyholes 184. The provision of these keyholes 184 allows the system operator to expeditiously mount the loading fixture 180 onto the bottom portion of the annular flange 21 that surrounds a manway 19 of the channel head 13 in the following manner. First, a pair of bolts (not shown) are screwed into the bottommost bolt holes 23 located in the annular flange 21. These bolts are dimensioned so that a portion of the bolt shank as long as the width of the base plate 182 extends above the upper surface of the flange 21 when the threaded ends of these bolts are screwed into the bolt holes 23. To mount the loading fixture 180, the system operator places the wide, circular portions of the keyholes 184 over the heads of the bolts previously screwed into the bolt holes 23, and then manipulates the plate so that the heads of these bolts extend over the narrower portions of each of the keyholes 184. The bolts are then tightened a revolution or two in order to snugly attach the wide end of the base plate 184 to the bottom portion of the flange 21.

The distal end of the support frame 186 includes a coupler 188 which is detachably connectably to the end effector coupler 41 of the arm 3. This coupler is affixed onto the end of the support frame 186 by means of mounting bolts 190. A pivotal connection assembly 92 pivotally connects the proximal end of the support frame 186 to the end of the base plate 182 that is opposite from the previously described keyholes 184. The pivotal connection assembly generally includes a shaft 194 which is secured at either end to a pair of opposing lugs 196a,b extending out of the base plate 182, and which is journalled to a pair of circular openings (not shown) present in the sidewalls 198a,b of the support frame 186.

Figure 11:
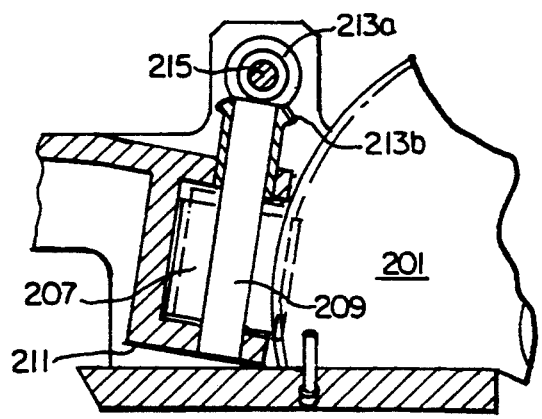
FIG. 11 is an enlarged, cross-sectional view of the manually operated drive train used to pivotally move the support frame of the loading fixture with react to the base plate.

A manually operated drive train 200 allows a system operator to pivot the distal end of the support frame 186 relative to the base plate 182 along the arch designated as A in FIG. 9. This drive train 200 includes a sprocket wheel 201 having a plurality of sprocket teeth 202 around its outer periphery. A mounting hub 203 having a set screw 205 engagable against the shaft 194 fixedly mounts the sprocket wheel 201 to the shaft 194. With specific reference now to FIGS. 10 and 11, the sprocket wheel 201 is rotated by means of a worm gear 207 fixedly connected to a gear shaft 209. The gear shaft 209 is in turn rotatably mounted within a shaft bracket 211. One end of the gear shaft 209 includes a bevel gear 213b which meshes with another bevel gear 213a connected to a drive shaft 215. The drive shaft 215 is in turn journalled within a pair of circular openings (not shown) located in the upper portion of the sidewalls 198a,b of the support frame 186. A hand wheel 217 having a handle 219 is connected onto one of the drive shaft 215. To pivot the support frame 186 relative to the base plate 182, all the system operator need do is to turn the handle 219 of the hand wheel 217.

The robotic arm 3 is installed within the channel head 13 in the following manner. First, the arm coupler 52 is unjoined in order to divide the robotic arm 3 into a first portion that includes the upper and lower arm segments 38,39, and the joint assemblies 42,44,45 and a second portion which includes the wrist segment 40 and the joint assemblies 47, 48,49. Since the joint assemblies constitute the vast majority of the weight of the robotic arm 3, the de-coupling of the arm at the location of the coupler 52 divides the arm into two portions having approximately equal weight. The system operator then manually inserts the first portion of the arm which includes arm segments 38,39 through the manway 19. Prior to such insertion, the upper arm joint assembly 44 is rotated 180° from the position illustrated in FIG. 2 so that the upper and arm segments 38,39 are extended away from one another. At the completion of this first step of the installation procedure, the system operator is careful to allow the female end of the arm coupler 52 to extend over the bottom portion of the flange 21 that circumscribes the manway 19. The loading fixture 180 is then installed in the manner previously described. To load the second portion of the arm, the hand wheel 217 is turned so that the support frame 186 is pivoted 180° away from the position illustrated in FIG. 9. The system operator, (careful to keep away from the "shine" of radiation emanating from the manway 19) then joins the coupler 188 on the distal end of the support frame 186 to the end effector coupler 41 located at the distal end of the robotic arm 3. He then turns the hand wheel to pivot the support frame 186 into the position illustrated in FIG. 9, taking care both to align and mate the male member 136 of the coupler 52 with the female member 152. Once a preliminary mating is made, the locking bar 162 is slid in the slot 164 and opening 147 in the coupler 52. To complete the coupling, the system operator then joins the male and female members 136, 152 by means of the threaded mounting ring 170 in the manner previously indicated. The robotic arm 3, then being supported at its distal end by the coupler 188 on the base plate 182 of the loading fixture 180, is then actuated by the control circuit assembly 7 to align and insert the cam lock assemblies 35a, 35b of the base assembly 34 into a pair of vacant heat exchanger tubes 9. The radially extendible fingers 36 of these cam lock assemblies 35a,b are then hydraulically actuated to install the base assembly 34 into a position in the tubesheet 11 as is illustrated in FIG. 1. In the final step of the installation process, the end effector coupler 41 is de-coupled from the coupler 188 of the load fixture 180, and recoupled to an end effector 5.

Figure 12:
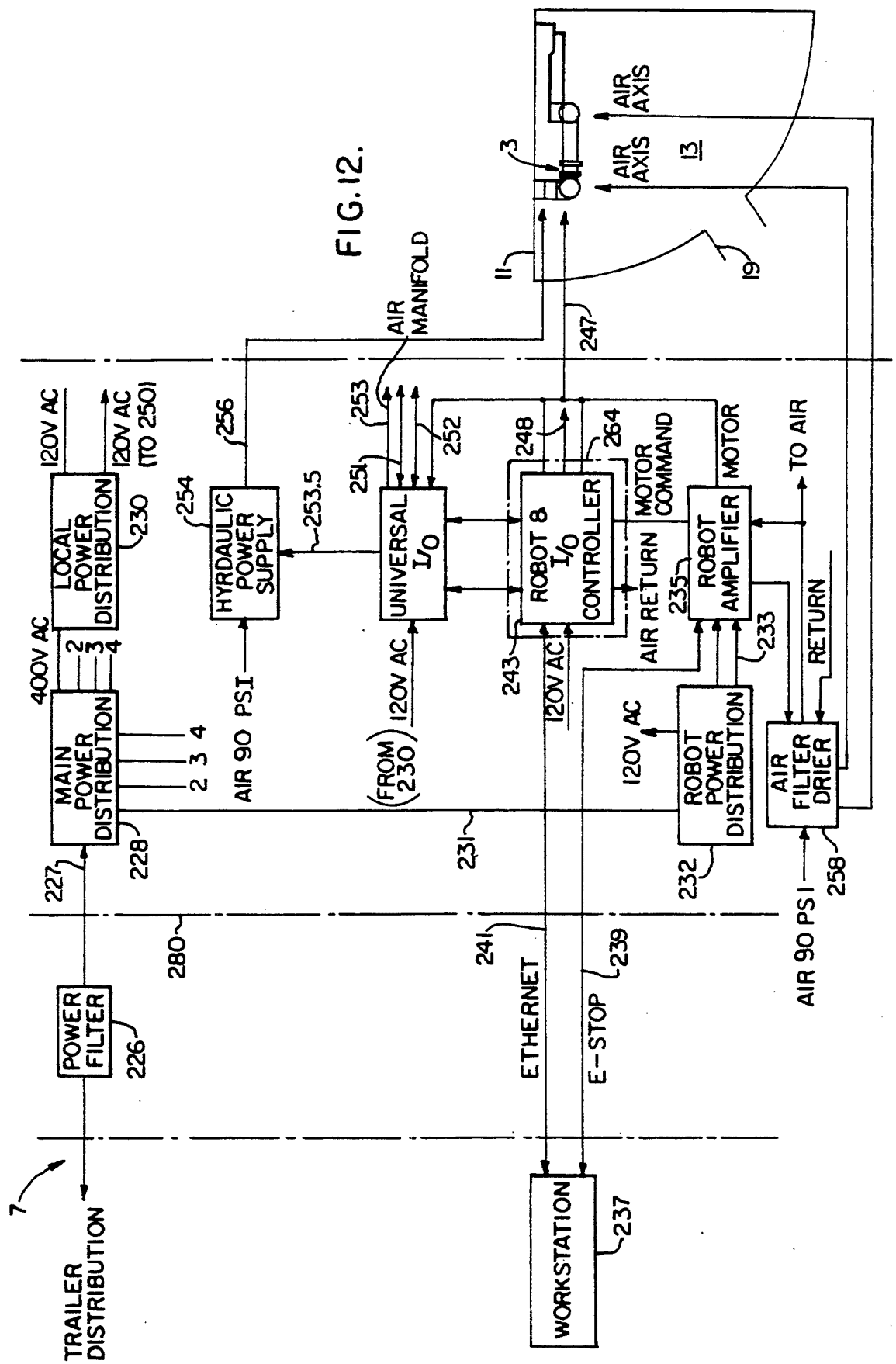
FIG. 12 is a schematic view of the control circuit assembly of the system, illustrating how a single CPU is used to control both the robotic arm and any end effector control thereto.

With reference now to FIG. 12, the control circuit assembly 7 of the invention includes a power filter 226 for eliminating "spikes" in the 480 volt, three phase alternating current received locally from the utility. The resulting, "smoothed" power is transmitted by way of an electric cable 227 to a main power distribution box 228. This box 228 is capable of distributing smoothed 480 volt, three phase power to as many as four different steam generators. The output of the main power distribution box 228 is connected not only to a local power distribution box 230 (which converts the 480 volt, three phase power to 120 volt single phase power in order to supply the power requirements of the end effectors 5), but is further connected to a robot power distribution circuit 232 by way of an electric cable 231. This robot power distribution circuit 232 converts the 480 volt, three phase current received from the main power distribution box 228 into 48 volt, single phase current suitable for powering the robot amplifier circuit 235. These two circuits are in turn interconnected by means of a cable 233 as shown. E-stop cable 239 is provided between the robot amplifier 235 and a location in the vicinity of the workstation for shutting down the controller 243 in the event of a CPU malfunction. The workstation 237 is connected to a robot and I/O controller 243 by means of an Ethernet ® cable 241. An Ethernet ® cable is preferred for this particular link-up since it is capable of transmitting over ten megabits of information per second, and since there is a large volume of informational exchange between the workstation 237, and the robot and I/O controller 243.

A multi-component cable 247 interconnects the output of both the robot amplifier 235 and the robot and I/O controller 243 to the electric motors 59 of each of the six motorized joint assemblies 42,44,45,47,48 and 49. This same cable 247 further connects the outputs of the front and rear resolvers 100,102 of each of the motorized joint assemblies to the input of the robot and I/O controller 243. Finally, the robot and I/O controller includes a cable 248 which is separately connected to the end effector 5 for supplying a high speed data acquisition interface with any end effector 5 disposed on the distal end of the robotic arm 3.

Connected in parallel to the robot and I/O controller 243 is a universal I/O circuit 250. As is indicated in FIG. 12, this circuit 250 receives 120 volts single phase a.c. on one side, and distributes control power to the various end effectors manipulated by the robotic arm 3 by way of cables 251,252. The universal I/O circuit 250 further supplies control power to an air manifold by way of a cable 253. The universal I/O circuit further actuates or deactuates a hydraulic power supply 254 by way of a control cable 253.5. The output of the hydraulic power supply is hydraulically connected to the cam lock assemblies 35a,b of the base assembly 34 of the robotic arm 3 by way of a pressurized fluid conduit 256. As has been indicated earlier, the control circuit assembly 7 includes a source of moving air in order to cool the various components of the system. Accordingly, an air filter dryer 258 is provided for removing particulate matter and moisture from the air circulated through both the robotic arm 3, and through various components 235,243, of the control circuit assembly 7 located in containment.

It should be noted that the vast majority of the components of the control circuit assembly 7 are designed to be quickly set-up and taken down within the containment wall 280 of the utility. Specifically, power distribution boxes 228 and 230, power redistribution box 232, robot amplifier 235, robot and I/O controller 243, universal I/O 250, hydraulic power supply 256 and air filter dryer 258 are each contained within a portable modular housing, and the various cables that interconnect these housings are of the quick-disconnect type to allow these components to be easily carried within the containment wall 280, and assembled in an area close to the vicinity of the channel head 13 of the steam generator. Such a portable, modular construction that is easily assembled behind the containment wall 280 advantageously minimizes the number of penetrations through the containment area to only three (i.e., the power cable 227, and the cables 239 and 241). Additionally, a decontaminatable cover 264 (an example of which is indicated in phantom around the robot and I/O controller 243) is provided for each of the components of the control circuit assembly 7 designed to be carried into and setup within the containment area of the utility. In practice, these covers may have a structure as simple as that of a plastic bag. Of course, the purpose of such covers 264 is to facilitate the decontamination of each of these components when they are removed from the containment area of the utility.

Figure 13:
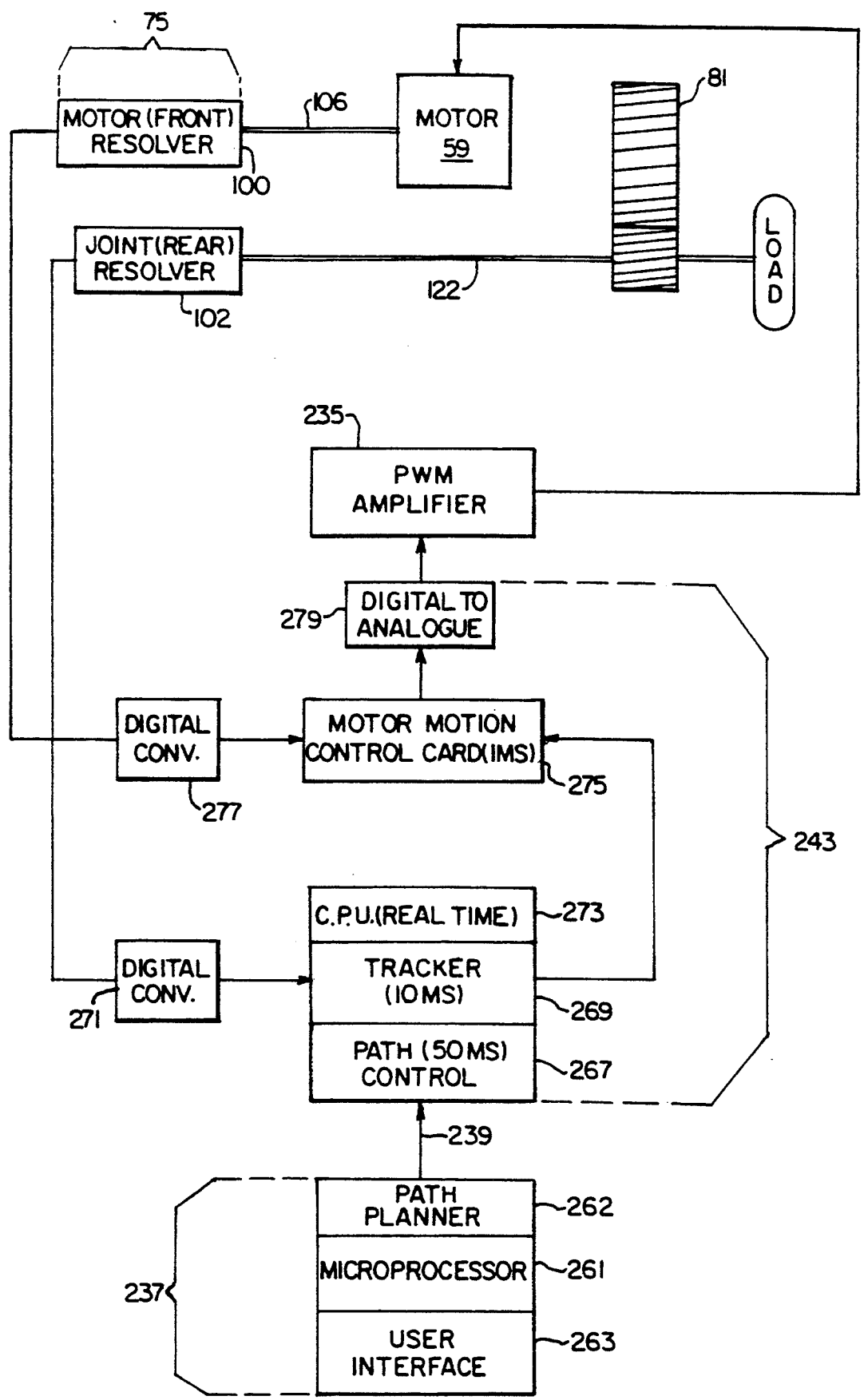
FIG. 13 is a functional box diagram illustrating how the resolvers in the joint assemblies cooperate to control the movement of the arm segments of the robotic arm.
Figure 14B:
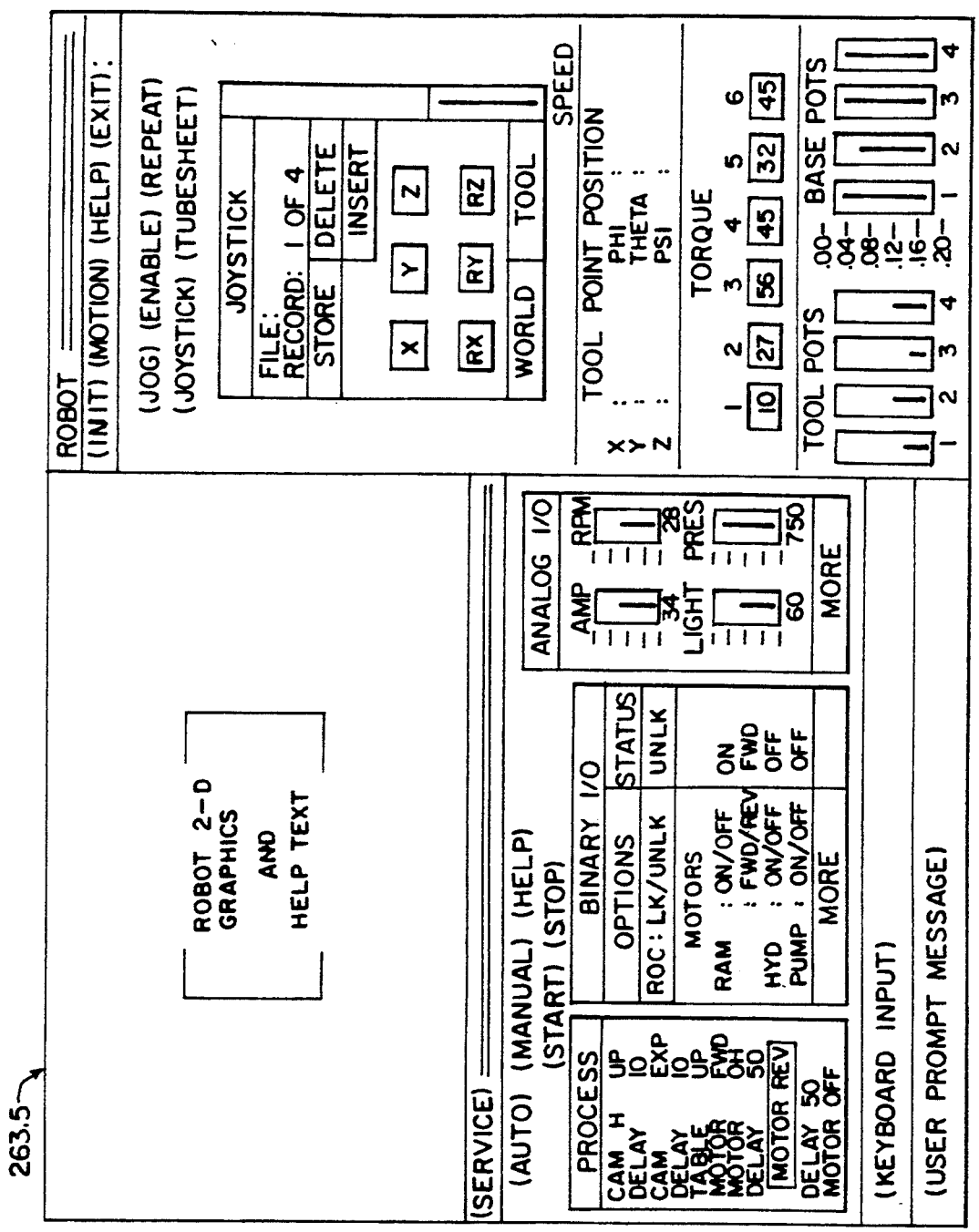
FIG. 14A and 14B are perspective view of the workstation of the control circuit assembly and the control display used at this workstation, respectively, illustrating how the system may be operated through a simple mouse-type handset.
Figure 14A:
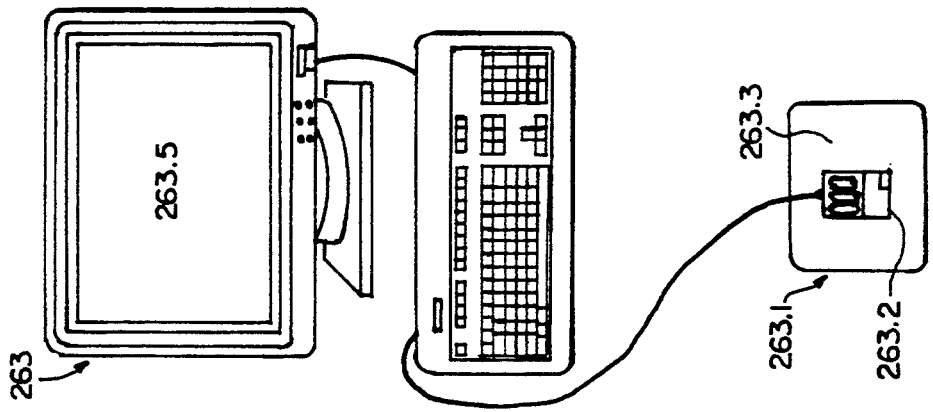

The method employed by the control circuit assembly 7 may best be understood with reference now to FIGS. 13, 14A and 14B. These figures illustrate in schematic form the functional relationships between the workstation 237, the robot and I/O controller 243, the amplifier 235, and the resolvers 100 and 102 of the resolver assembly 75, and the motors 59 and harmonic drives 81 of each of the motorized joint assemblies of the robotic arm 3.

With specific reference to FIGS. 14A and 14B, the workstation 237 is a model 4D25G "personal Iris" computer manufactured by Silcon Graphics, Inc., located in Mountainview, California. Such a workstation has a microprocessor 261, path planner software 262, and a user interface 263 advantageously formed from what may be described as a digital three-button mouse teleoperation 263.1, which replaces the standard analog joystick arrangement associated with the prior art. In this interface, the operator makes selections from the display 263.5 on the interface crt tube illustrated in FIG. 14B. Specifically, to pick a selection, the operator slides the mouse 263.2 on the pad 263.3 until the arrow on the display 263.5 is over the text describing the desired selection, and then presses the mouse button. Plus and minus direction moves are then made by using the right and middle buttons of the mouse 263.2. Velocity control end point moition with mouse speed selection maintains the intuitive feel of a joystick operation, at a substantially lesser cost.

With reference again to FIG. 13, the microprocessor 261 of the workstation 237 is programmed with the path planner software 262. The purpose of the path planner 262 is to convert generalized direction commands (for example, "move distal end of robotic arm from tube location 3A to 6F") into six degree vectors (including x, y, and z Cartesian axes and roll, yaw and pitch) which will be understandable to the robotic arm kinematics software that is present within the path control section 267 of the robot and I/O controller 243. It should be noted that the path planner 262 "knows" the possible universe of trajectories (i.e., trajectories which avoid collisions between the arm and the channel head, or the arm and an end effector) when it performs its function of converting the generalized commands given by the operator of the workstation 237 into specific, six degree vectors.

Turning now to a functional description of the robot and I/O controller 243, the specific vector instruction information relayed to the controller 243 is next converted into a specific set of joint angles by the interaction of the central processing unit (CPU) 273 of the controller 243 and a robot kinematic software package designated as path control 267. The CPU is preferably a model number HK68/V30 computer manufactured by Heurikon Corporation located in Madison, Wisconsin. The CPU of 273 of the controller 243 then periodically transmits an actuation signal through a motor motion control card 275 which in turn modulates the power conducted to the motors 59 of the motorized joint assemblies to achieve the desired trajectory. However, before transmitting its command signals to the motor motion control card 275, the CPU 273 processes information from tracker software 269 whose purpose is to inform the CPU 273 as to which specific increment of the robotic kinematics associated with the desired trajectory has been complete. The tracker 269 is able to perform this function by receiving what amounts to a feedback signal from the rear joint resolver 102, which, as has been indicated earlier, is mechanically linked via shaft assembly 122 to the output of the harmonic drive

81, which, of course, is determinitive of the angle that the joint has turned. Prior to receiving the sine-wave analog signal generated by the joint resolver 102, this signal is converted into a 16 bit digital signal by digital converter 271 to render it in a form which can be processed by the tracker software 269.

In operation, the CPU interacts with the path control and tracker software 267 and 269 in the following manner. First, the path control software 267 informs the CPU of the series of incremental steps of robotic arm kinematics necessary to achieve a desired trajectory. It transmits this information to the CPU every 50 milliseconds. By contrast, the tracker software 269 informs the CPU 273 when a particular increment in the series of kinematic commands has been completed. It transmits this information to the CPU every ten milliseconds. The motor motion control card 275 converts every increment of the robotic kinematics into specific electric power commands to the motor 59 which determines the speed and amount of motor shaft rotation. The CPU will tell the motor motion control card to change the motor power commands that it generates only when the tracker 269 has informed the CPU that a particular increment of the robotic arm kinematics has been achieved. Of course, the relatively low power digital signals generated by the motor motion control card 275 must be converted back to analog signals to properly modulate the pulse-type d.c. power conducted through the motor 59 by the amplifier 235.

It is important to note that the signals generated by the motor motion control card 275 are not entirely dependent upon the actuation signals indirectly generated through the tracker software 269, but are further dependent upon the feedback signal received by the front motor resolver 100 whose input shaft is directly connected to the output shaft of the motor 59. As was the case with the rear resolver 102, the sinewave analog signal generated by the motor resolver 100 is converted into digital form by means of digital conversion circuit 277. In operation, the motor motion control card 275 will always follow the feedback signal received by the motor resolver 100 in the short run, over each 10 milliseconds incremental period. However, for time periods of 20 milliseconds or greater, any conflict between the feedback signals generated by the motor and joint resolvers 100 and 102 will be resolved in favor of the joint resolver 102. Such a method of operation advantageously prevents the imposition of any noise that is present from the feedback signal generated by the joint resolver 102 as a result of "windup" in the shaft assembly 122 between the resolver and the harmonic drive 81, or backlash. Because the motor motion control card 275 generates it control signals primarily on the basis of the relatively noise-free feedback generated by the motor resolver 100, the power modulation signal generated by the amplifier 235 is likewise largely noise-free, which in turn results in far smoother motor control and hence far smoother motion of the joint assembly.

I claim:

1. A robotic arm system for maintaining a tool in a desired orientation while moving it along a trajectory having components in all three dimensions, comprising:
   a base assembly for cantileverly supporting a robotic arm;
   at least first, second and third arm segments for forming an articulated robotic arm, and
   at least first and second motorized joint assemblies rotatably connecting said base assembly to said first arm segment, and said first and second arm segments, respectively, and including motor mechanisms for driving said assemblies,
   wherein said first and second joint assemblies are rotatable only around substantially vertical axes to prevent the application of cantileverly-induced torque on the motor mechanisms driving said assemblies, and wherein the motor mechanisms of each of said joint assemblies includes a drive train for rotating the joint assembly, a motor means for driving the drive train, and a pair of resolvers for simultaneously and independently generating signals indicative of the output of said motor means and the output of said drive train.

2. A robotic arm system as defined in claim 1, wherein said motor means is circumscribed by said drive train.

3. A robotic arm system as defined in claim 1, wherein said resolvers are circumscribed by said motor means.

4. A robotic arm system as defined in claim 3, wherein said resolvers are concentrically arranged in tandem with respect to one another in an opening in the drive shaft of the motor means to minimize the space required by said resolvers within said motor mechanisms.

5. A robotic arm system as defined in claim 1, wherein said resolvers are arranged in tandem with respect to one another to minimize the space required by said resolvers within said motor mechanisms.

6. A robotic arm system as defined in claim 5, wherein each resolver has an input shaft, and wherein the input shaft of one resolver is rotatably mounted within a bore present in the input shaft of the other resolver.

7. A robotic arm system for maintaining a tool in a desired orientation while moving it along a trajectory having components in all three dimensions, comprising:
   a base assembly for cantileverly supporting a robotic arm;
   at least first, second and third arm segments for forming an articulated robotic arm,
   at least first and second motorized joint assemblies rotatably connecting said base assembly to said first arm segment, and said first and second arm segments, respectively, and including motor mechanisms for driving said assemblies, wherein said first and second joint assemblies are rotatable only around substantially vertical axes to prevent the application of cantileverly-induced torque on the motor mechanisms driving said assemblies, and
   a coupler means for detachably mounting one portion of the robotic arm of the system to the other portion to facilitate the installation of said arm in an area accessible only through a relatively narrow accessway, wherein said robotic arm has an even number of motorized joint assemblies, and said coupler means divides the robotic arm into two portions, each of which has the same number of joint assemblies.

8. A robotic arm system for maintaining a tool in a desired orientation while moving it along a trajectory having components in all three dimensions comprising:
   a base assembly for cantileverly supporting a robotic arm;
   wherein said base assembly includes locking means for detachably mounting said arm to the underside of a tubesheet having at least one vacant tube, including a plurality of radially extendible fingers for grippingly engaging the inner surface of said tube, wherein said fingers engage at least 40 percent of the circumference of the tube inner surface;

at least first, second and third arm segments for forming an articulated robotic arm, and at least first and second motorized joint assemblies rotatably connecting said base assembly to said first arm segment, and said first and second arm segments, respectively, and including motor mechanisms for driving said assemblies, wherein said first and second joint assemblies are rotatable only around substantially vertical axes to prevent the application of cantileverly-induced torque on the motor mechanisms driving said assemblies.

9. A robotic arm system for moving an end effector in a desired orientation while moving it along a trajectory having components in all three dimensions within a radioactive channel head of a nuclear steam generator having a tubesheet, and a manway for affording access to said channel head, comprising:

a base assembly for cantileverly supporting a robotic arm;

at least first, second and third arm segments for forming an articulated robotic arm, and at least first and second motorized joint assemblies rotatably connecting said base assembly to said first arm segment, and said first and second arm segments, respectively, and including motor mechanisms for driving said assemblies;

wherein said first and second joint assemblies are rotatable only in a plane parallel to the tubesheet both to prevent the application of cantileverly induced torque on said first and second motor mechanisms, and to minimize opportunities for mechanical interference between said arm and the walls of said channel head.

10. A robotic arm system as defined in claim 9, wherein the motor mechanisms of each of said joint assemblies includes a drive train having an input shaft and an output shaft, and a motor means having a drive shaft connected to the input shaft of the drive train, and a pair of resolvers for simultaneously and independently generating a signal indicative of the movement of the output shaft of the drive train and the drive shaft of the motor means.

11. A robotic arm system as defined in claim 10, wherein said motor means is circumscribed by said drive train, and said resolvers are circumscribed by said motor means.

12. A robotic arm system as defined in claim 11, wherein said resolvers are arranged in tandem, and wherein each resolver has an input shaft, and the input shaft of one resolver is concentrically and rotatably mounted within a bore present in the input shaft of the other resolver to minimize the space required by said resolvers within said motor mechanisms.

13. A robotic arm system as defined in claim 9, further comprising a coupler means for detachably mounting one portion of the robotic arm of the system to the other portion to facilitate the installation of said arm in said channel head through said manway.

14. A robotic arm system as defined in claim 13, wherein said robotic arm has six motorized joint assemblies, and said coupler means divides the robotic arm into two portions, each of which includes three joint assemblies.

15. A robotic arm system as defined in claim 13, wherein said coupler includes a male member, a female member, and a locking ring means for securing said male and female members together.

16. A robotic arm system as defined in claim 15, further comprising a loading fixture for loading said robotic arm into said channel head which is detachably mountable on the periphery of the manway.

17. A robotic arm system as defined in claim 16, wherein said loading fixture includes a base plate that is detachably connectable to the periphery of the manway, a support frame pivotally connected to said base plate for supporting one of said portions of said robotic arm, and a manually operable gear train for pivotally moving said support frame toward said manway to load said robotic arm portion into said channel head.

18. A robotic arm system as defined in claim 9, wherein said base assembly includes locking means for detachably mounting said arm to the underside of a tubesheet having at least one vacant tube, including a plurality of radially extendible fingers for grippingly engaging the inner surface of a said tube, wherein said fingers engage at least 40 percent of the circumference of the tube inner surface.

19. A robotic arm system for moving a tool along a desired trajectory, comprising:

an articulated robotic arm having a plurality of rotatable joint assemblies connected between a plurality of arm segments, each of which includes a motor mechanism for rotating said joint assemblies a desired angle, each motor mechanism including an electric motor means having a drive shaft, and a drive train having an output shaft connected to one of said robotic arm segments;

a control means for generating an electric signal that controls the amount of electric power conducted to the electric motor means of each of said assemblies to control the angle of movement of said joints, and first and second resolver means connected to said motor drive shaft and said drive train output shaft, respectively, for providing separate feedback signals to said control means indicative of the angular position of said drive and output shafts.

20. A robotic arm system as defined in claim 19, wherein the mechanical output of the output shaft is characterized by a component of mechanical noise, and wherein said control means relies upon the feedback signal generated by said first resolver means in determining the angular position of the robotic arm segment connected to the output shaft of the drive train to avoid the superimposition of said noise component on the control signal generated by said control means.

21. A robotic arm system as defined in claim 20, wherein the control means periodically compares the feedback signals generated by said first and second resolvers to determine the integrity of the mechanical linkage between said motor means and drive train.

22. A robotic arm system as defined in claim 20, wherein said drive train is a harmonic drive.

23. A robotic arm system as defined in claim 19, wherein at least one of said joint assemblies is rotatable along a horizontal axis and cantileverly supports the weight of at least a portion of said robotic arm, and wherein said control means shunts electric current generated by the electric motor means of said joint assembly to apply a braking action to said assembly whenever the weight of said cantilevered arm portion is allowed to rotate the motor drive shaft through said drive train.

24. A robotic arm system as defined in claim 19, wherein said control means includes a central processing unit (CPU) and said tool is computer operated, and wherein the CPU of the control means operates both the joint assemblies of the robotic arm and the computer operated tool.

25. A robotic arm system as defined in claim 24, wherein said robotic arm system moves a tool in a contained area of radioactivity in a nuclear power plant, and said CPU of said control means is located within said contained area to minimize the number of cable penetrations into said contained area.

26. A robotic arm system as defined in claim 25, wherein said CPU includes a decontaminable cover means.

27. A robotic arm system as defined in claim 19, wherein said motor means is circumscribed by said drive train, and said resolvers are circumscribed by said motor means.

28. A robotic arm system as defined in claim 27, wherein said resolvers are arranged in tandem, and wherein each resolver has an input shaft, and the input shaft of one resolver is concentrically and rotatably mounted within a bore present in the input shaft of the other resolver to minimize the space required by said resolvers within said motor mechanisms.

29. A robotic arm system for moving an end effector along a desired trajectory within a contained area of radioactivity comprising:
an articulated robotic arm having a plurality of rotatable joint assemblies for rotating said joints a desired angle, each assembly including a motor mechanism having an electric motor means having a drive shaft, and a drive train having input and output shafts connected to said motor drive shaft and one of said joints, respectively;
a control means for generating a signal for controlling the amount of electric power conducted to the electric motor means of each of said assemblies to control the angle of movement of said joints, and
first and second resolver means having mechanical inputs connected to said motor drive shaft and said drive train output shaft, respectively, for providing separate feedback signals to said control means indicative of the angular position of said drive and output shafts, respectively,
wherein the control means uses the feedback signal from the motor drive shaft to modulate the amount of power conducted to the electric motor of the assembly to avoid the superimposition of noise on the power control signal generated by the control means, and periodically compares the feedback signals of both resolvers to determine the integrity of the mechanical linkage between said motor and said drive train.

30. A robotic arm system as defined in claim 29, wherein said drive train is a harmonic drive.

31. A robotic arm system as defined in claim 29, wherein the mechanical output of the output shaft is characterized by a component of mechanical noise, and wherein said control means relies upon the feedback signal generated by said first resolver means in determining the angular position of the robotic arm segment connected to the output shaft of the drive train to avoid the superimposition of said noise component on the control signal generated by said control means.

32. A robotic arm system as defined in claim 29, wherein the control means includes a CPU, and said end effector is computer operated, and wherein the CPU of the control means simultaneously operates the joint assemblies of the robotic arm and the end effector.

33. A robotic arm system as defined in claim 32, wherein said CPU of the control means is located within the contained area to minimize the number of cable penetrations into said contained area.

34. A robotic arm system as defined in claim 33, wherein said CPU includes a decontaminable cover means.

35. A robotic arm system as defined in claim 29, wherein said motor means is circumscribed by said drive train, and said resolvers are circumscribed by said motor means.

36. A robotic arm system as defined in claim 25, wherein said resolvers are arranged in tandem, and wherein each resolver has an input shaft, and the input shaft of one resolver is concentrically and rotatably mounted within a bore present in the input shaft of the other resolver to minimize the space required by said resolvers within said motor mechanisms.

37. A method for controlling an articulated robotic arm having at least one rotatable joint assembly that includes a drive train having an output shaft for moving said arm, and a motor means having a drive shaft for driving said drive train, comprising the steps of
a) generating a first electric signal indicative of the amount that the drive shaft of the electric motor means rotates;
b) generating a second electric signal indicative of the angular position of the robotic arm by multiplying the number of drive shaft rotations by the gear ratio between the drive shaft of the motor means and the output shaft of the drive train, and
c) modulating the amount of electric current conducted through the electric motor means by means of said second electric signal, and
d) terminating the flow of current through said electric motor means when said second electric signal indicates that said arm has been moved to a desired position.

38. A method for controlling an articulated robotic arm as defined in claim 37, further including the step of generating a third electric signal indicative of the amount that the robotic arm actually rotates and comparing said second and third signals to determine whether or not any slippage is present between said motor drive shaft and said drive train.

39. A robotic system for both delivering a plurality of computer operated end effectors within the radioactive channel head of a nuclear steam generator located in a containment area in a power plant, and for operating each of said plurality of end effectors, comprising:
an articulated robotic arm having a proximal end connected to a base assembly that is detachably connectable to a tubesheet disposed within said channel head, a distal end having a coupler that is detachably connectable to each of said plurality of end effectors, and a plurality of motorized joint assemblies including electric motor means for moving said distal end of said arm, and
a control means including a CPU for both directing the movement of said distal end by controlling the input of electric power to the electric motor means of said assemblies, and for simultaneously controlling the operation of said end effectors.

40. A robotic system as defined in claim 39, wherein said robotic arm includes six motorized joint assemblies for maintaining said end effector in a desired orientation while moving it along a trajectory having components in all three dimensions.

41. A robotic system as defined in claim 39, wherein said CPU is located within said contained area to minimize the number of cable penetrations into said contained area.

42. A robotic system as defined in claim 41, wherein said CPU includes a decontaminatable cover means.

* * * * *